United States Patent
Wilson

[11] Patent Number: 6,088,952
[45] Date of Patent: Jul. 18, 2000

[54] PLANT PROTECTORS

[75] Inventor: Malcolm William Wilson, East Malvgen, Australia

[73] Assignee: Rossmarg Pty. Ltd., Victoria, Australia

[21] Appl. No.: 08/983,499

[22] PCT Filed: Jul. 16, 1996

[86] PCT No.: PCT/AU96/00448

§ 371 Date: Aug. 17, 1998

§ 102(e) Date: Aug. 17, 1998

[87] PCT Pub. No.: WO97/03551

PCT Pub. Date: Feb. 6, 1997

[30] Foreign Application Priority Data

Jul. 17, 1995 [AU] Australia ............................ PN 4193

[51] Int. Cl.[7] .................................................. A01G 13/02
[52] U.S. Cl. ........................................................ 47/30
[58] Field of Search .................................. 47/20, 21, 26, 47/28.1, 30; 229/98.2

[56] References Cited

U.S. PATENT DOCUMENTS

| | | | |
|---|---|---|---|
| 1,747,967 | 2/1930 | Bell | 47/28.1 |
| 2,007,088 | 7/1935 | Jones | 229/103.2 |
| 4,059,221 | 11/1977 | Olson et al. | 229/39 R |
| 5,471,783 | 12/1995 | McLean | 47/30 |
| 5,809,690 | 9/1998 | Due et al. | 47/26 |
| 5,842,633 | 12/1998 | Nurse | 229/403 |

*Primary Examiner*—Michael J. Carone
*Assistant Examiner*—Jeffrey L. Gellner
*Attorney, Agent, or Firm*—Knobbe, Martens, Olson & Bear, LLP

[57] ABSTRACT

The plant protector is designed to form a sleeve of triangular cross-section from a flat sheet 10 having a width of 285 mm by way of example. The sleeve is attached to a horizontal support wire 11 by folding a top securing flap 12 past and around the wire 11. The sheet 10 can be of various lengths to form erected sleeves of different heights to suit different applications. By way of example the erected sleeve can be of a number of different heights within a range of about 300 mm to about 1600 mm.

Sleeve 13, has spaced sealing tabs 14 along each of the longitudinal edges. The lower end 15 may be engaged with the ground while the upper end has a horizontal crease line 16 for the securing flap 12. The tabs 14 along the two longitudinal edges are mutually offset so that the tabs 14 along each edge align with the inter-tab spaces 15 along the opposite edge so that a dove-tail closing action is achieved.

16 Claims, 5 Drawing Sheets

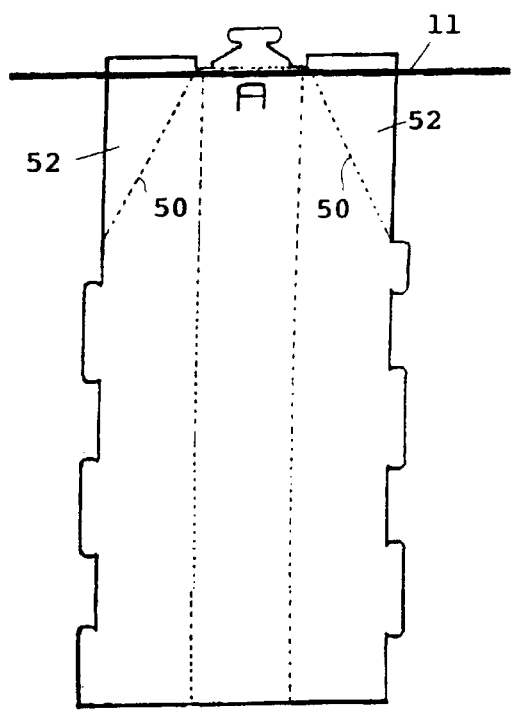 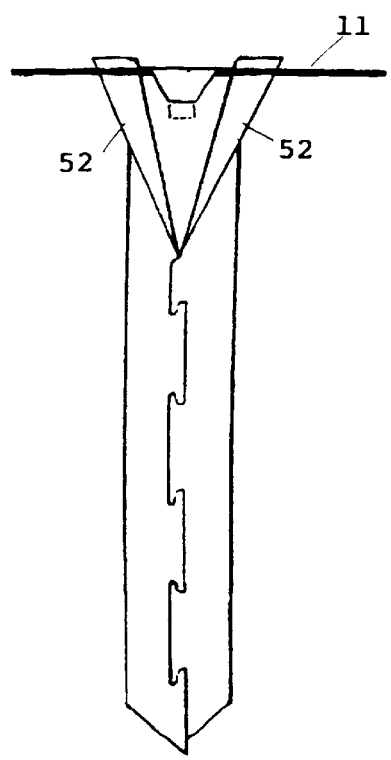
FIG. 7
FIG. 8

PLANT PROTECTORS

FIELD OF THE INVENTION

This invention relates to plant protectors, and more particularly to protective sleeve-like members for mounting by means of support-wire attachment to protect vines, trees and other growing plants.

SUMMARY OF THE INVENTION

According to the present invention, there is provided a plant protector comprising a flexible sheet which is adapted to be deformed to surround an upstanding vine, tree or other growing plant to constitute a vertically elongate protective sleeve, said sheet having opposed elongate side edges which, when the sleeve is assembled around the plant, are in adjacent relationship, and means for releasably securing the adjacent elongate side edges of the assembled sleeve, said securing means comprising a series of spaced projecting tabs along each of said edges so arranged that the respective tabs of the two series interengage, with the edge portions of adjacent tabs interengaging one behind the other.

Further according to the present invention, there is provided a plant protector comprising flexible sheet which is initially substantially flat and is adapted to be folded to surround an upstanding vine, or other growing plant to constitute a vertically elongate protective sleeve, means for sealingly and releasably securing the adjacent side edges of the sheet in assembled relation, and an integral securing flap at the upper end of the protector, said flap being foldable about a horizontal crease line alignable with a horizontal supporting wire whereby the securing flap may be folded over the wire to an operative position at which releasable locking means on the securing flap retains the flap in position to secure the plant protector to the wire.

Preferably in a practical embodiment of the invention, the flexible sheet is made of material such as plastic flute board for example "CORFLUTE" (with the flute lines running vertically) or any other material having such characteristics that edge tabs on the sheet will exhibit retention resilience when engaged with and between other edge tabs.

Preferably the releasable locking means on the securing flap comprises a medially-disposed T-shaped tab at the uppermost extremity of the flap and adapted to register with a locking slot through which the tab ends may be passed and resiliently retained.

The protective sleeve could be designed to be of any one of a number of cross-sections. However, it is preferred that the sheet forming the sleeve has longitudinal crease lines which permit the sheet to be folded into a triangular formation, although other polygonal formations could alternatively be used.

In a preferred embodiment, the elongate side edges of the sheet are secured together by spaced tabs along said edges with indents or spaces between tabs corresponding to the positions of the tabs on the other edge such that a dove-tail closing mechanism is achieved with the tabs of the two edges interlocking when pulled across each other, the tabs being designed so that they hold tightly but releasably and without leaving gaps through which a plant could grow, the releasability permitting opening and closing as frequently as desired for access to the plant but without likelihood of damage.

Additional features may be provided as required. For example, the protector can be so made and arranged that it can be stapled or tied to a stake adjacent thereto when the protective sleeve is operative. Preferably, the lower end of the sleeve has at least one hole for the passage of a steel pin or equivalent means for hammering in and anchoring to the ground. Also, suitable tie wire holes are provided near to each side edge of the sheet in register with one another and adjacent the lower ends of inclined upper edge portions which permit access to the upper end of the protective sleeve, the tie wire holes being usable in the unlikely event of damage to the lower closure means or if a training string is to be attached to take a vine to a higher wire. Preferably the protector is formed with air holes to permit a cooling air flow through the interior to prevent burning of the plant in hot areas; the air holes are incorporated at a level above that at which herbicidal sprays applied to the ground for weed control are likely to enter the holes.

BRIEF DESCRIPTION OF THE DRAWINGS

Embodiments of the invention will now be described, by way of example only, with reference to the accompanying drawings, in which:

FIG. 7 shows yet another embodiment of the invention in its unassembled state; and FIG. 8 shows the embodiment of FIG. 7 in its assembled state.

DETAILED DESCRIPTION OF THE PREFERRED EMBODIMENT

Figure 1:
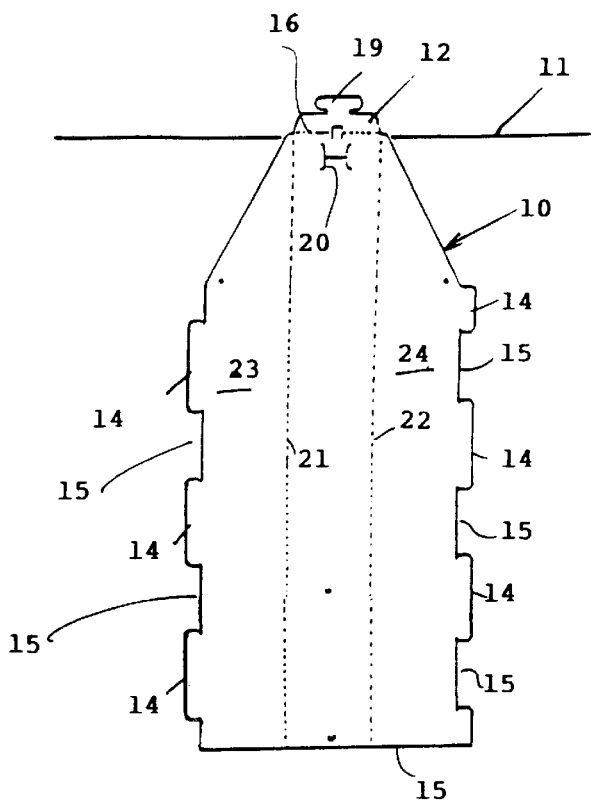
FIG. 1 is a front view of a plant protector in accordance with a preferred embodiment of the invention, the protector being shown in its unassembled state prior to assembly around a plant.

The embodiment shown in the drawings is designed to form a sleeve of triangular cross-section from a flat sheet 10 having a width of 285 mm by way of example. The sleeve is attached to a horizontal support wire 11 by folding a top securing flap 12 past and around the wire 11. The sheet 10 can be of various lengths to form erected sleeves of different heights to suit different applications. By way of example the erected sleeve can be of a number of different heights within a range of about 300 mm to about 1600 mm.

In the drawings the sleeve is indicated generally by the numeral 13, there being spaced sealing tabs 14 along each of the longitudinal edges. The lower end may be engaged with the ground while the upper end has a horizontal crease line 16 for the securing flap 12. The tabs 14 along the two longitudinal edges are mutually offset so that the tabs 14 along each edge align with the inter-tab spaces 15 along the opposite edge so that a dove-tail closing action is achieved as apparent from FIGS. 4 and 5.

Conveniently the flexible sheet is made in this instance of "COREFLUTE" but other materials could be used as explained above.

The top securing flap 12 is foldable about a horizontal crease line 16 and has a locking tongue 17, the flap 12 being secured by means of a T-shaped tab 19 adapted to engage in an H-shaped locking slot formation 20 in the sheet.

The horizontal crease line 16 has at each end vertical crease lines 21 and 22 permitting folding of the sheet to form two vertically extending side panels 23 and 24 whereby the erected sleeve is of a generally triangular cross-section, although other cross-sectional shapes may alternatively be used.

Figures 4, 5:
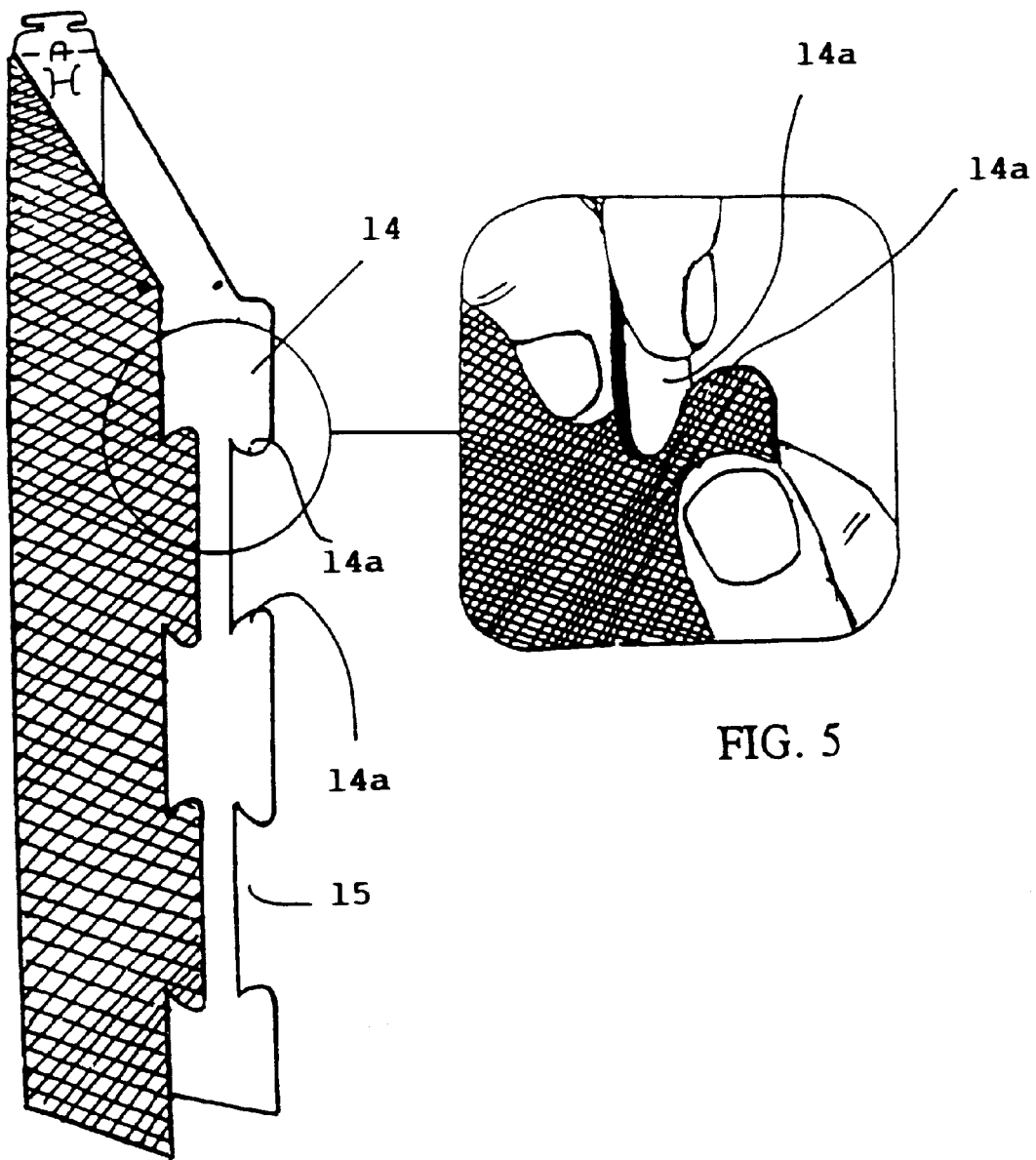
FIGS. 4 and 5 are schematic views illustrating the manner in which the protector is assembled, FIG. 5 being a detailed view of a part of FIG. 4.

In use, the top attachment system enables the protector to be fixed to the wire without any clips. The locking tongue 17 locks the wire at the top and the tab 19 on the securing flap 12 is prevented from slipping out of the slot 20 as shown in the drawings, whereby the securing flap 12 is held against disengagement. The sealing tabs 14 ensure that the sleeve is closed tightly and prevents any gaps through which the plant could grow. However, it can be opened and closed many times without damage so that access to the plant is possible. The manner in which the sleeve is opened and closed by manipulating the tabs 14 is illustrated in FIGS. 4 and 5, from which it will be noted that the edge portions of each tab 14 have an undercut formation 14a which releasably, but positively, interlocks with the undercut formation of the adjacent edge portion of the adjacent tab by simple manipulation of the tabs.

Figure 6:
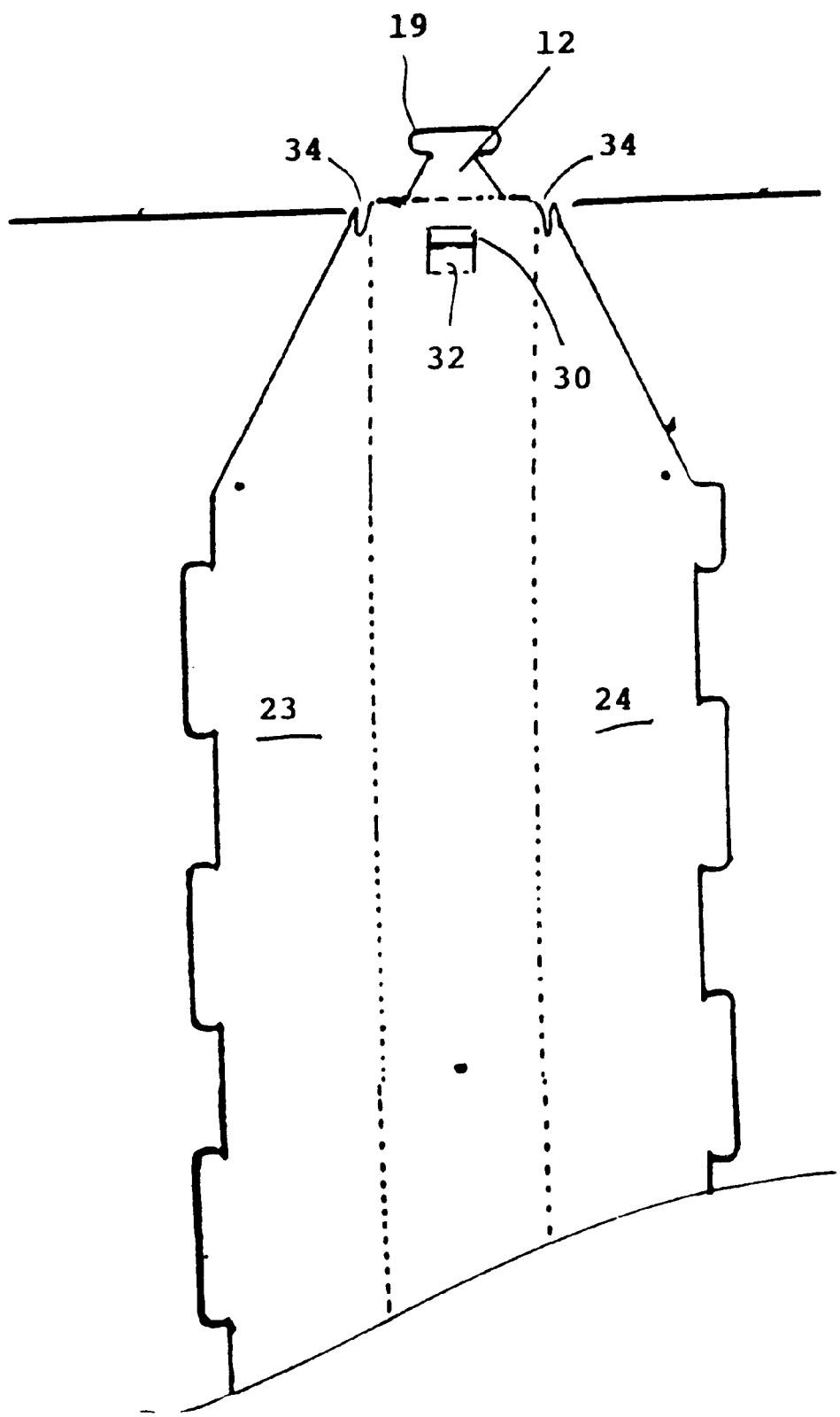
FIG. 6 shows another embodiment of the invention in its unassembled state.

In the embodiment shown in FIG. 6 the securing flap 12 is of simpler construction and avoids the need for a locking tongue. The flap 12 in this embodiment is engaged in a rectangular locking slot 30 in the sheet and is securely retained therein by the co-operation between the tab 19 and the sides of the locking slot 30 and also by means of a locking tab 32 at the base of the locking slot 30, the locking tab 32 being foldable about a horizontal crease line. In this embodiment, notches 34 for receiving the supporting wire whereby to provide firm location of the protector relative to the wire, are provided at the inner edges of the two outer panels 23,24.

Figure 2:
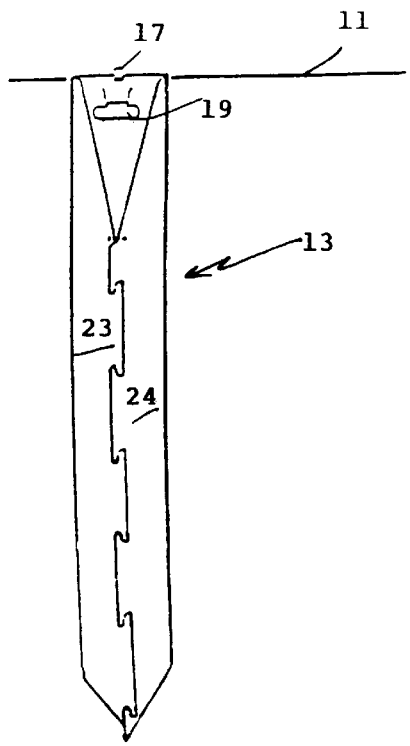
FIG. 2 is a front view showing the protector in its assembled state and installed to a supporting wire.
Figure 3:
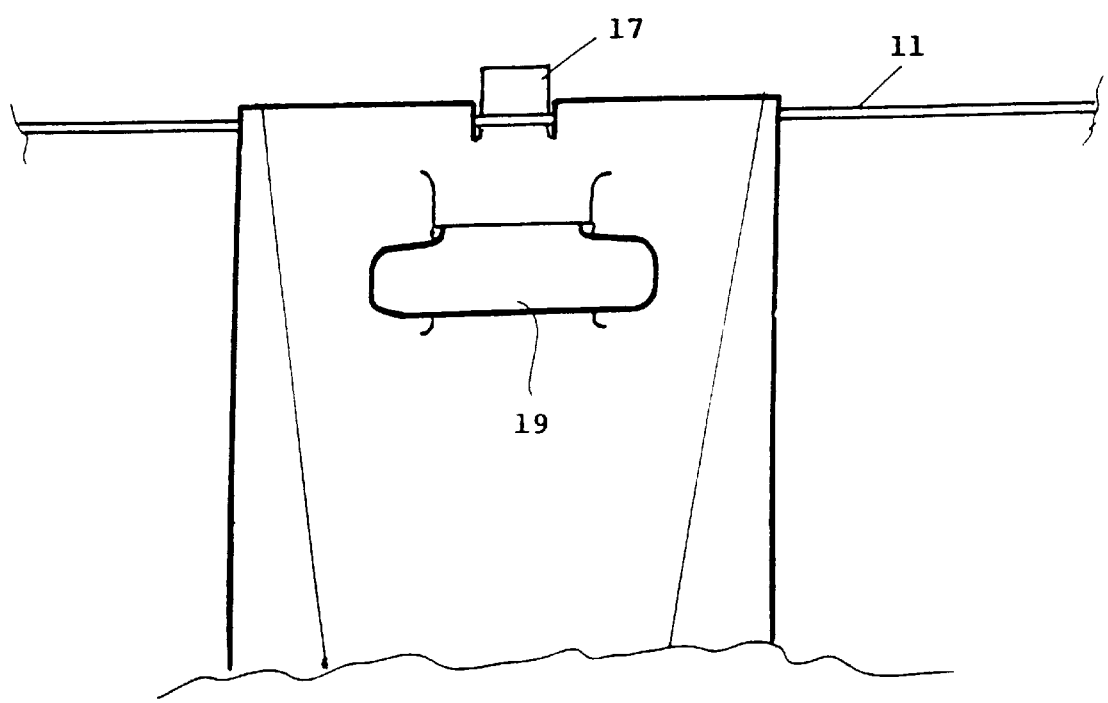
FIG. 3 is an enlarged detail showing the manner in which the protector is secured to the supporting wire.

In the embodiments described thus far the opposite sides of the flat sheet 10 are cut away towards their upper ends to form an opening at the front of the protector. This opening is clearly visible in FIG. 2 and is designed to permit exit of lateral growth. Although as shown in the drawings the opening formed by the cutaway portions is of a V-shape, it may alternatively be of another shape to achieve the same purpose. In some instances the cutaway to form the opening can leave a rough edge, particularly if the protector is formed from flute board and the roughness of the edge may cause some damage to the plant. The embodiment shown in FIGS. 7 and 8 avoids this difficulty by forming the opening not by cutting back the edges of the sheet but, instead, by forming inclined fold lines 50 which define flaps 52 which, in the assembled protector as shown in FIG. 8, are folded back and retained behind the supporting wire. The flaps 52 thus form a collar at each side of the opening and thus avoid the formation of a rough edge at the position at which lateral growth exits the protector via the opening.

While the protector of the preferred embodiments is particularly applicable to vine guard applications, its wider usages will be readily apparent, and of course it will be usable with either a single supporting wire at any desired height from the ground, or with a trellis or fence-type structure having a plurality of wires at different heights. The plant protector may be made simply and inexpensively, is light in weight for ease of transportation and can be stacked in large numbers in compact form. In use, the protector will guard against damage to the plant from severe weather, vermin, and the effects of herbicide sprays to the surrounding ground.

What is claimed is:

1. A plant protector, comprising a flexible sheet adapted to be deformed to surround a growing plant to constitute a vertically elongate protective sleeve, said sheet having:

opposed elongate side edges which, when the sleeve is assembled around the plant, are in adjacent relationship;

means for releasably securing the adjacent elongate side edges of the assembled sleeve, said securing means comprising a series of spaced projecting tabs along each of said edges so arranged that the projecting tabs of the two side edges interengage, with edge portions of adjacent projecting tabs interengaging one behind the other, and being of undercut formation whereby the interengaged edge portions of the flaps are positively interlocked one to the other;

means for securing an upper end of the plant protector to a horizontal supporting wire, said securing means comprising a securing flap extending from the upper end of the plant protector and being foldable about a horizontal crease line around the supporting wire; and means for releasably retaining the securing flap in its folded condition to releasably secure the plant protector to the supporting wire.

2. The plant protector of claim 1, wherein the securing flap comprises a locking tab engageable within a locking slot in the sheet material to retain the flap in its folded condition.

3. The plant protector of claim 1, wherein the securing flap is integral with the sheet.

4. A plant protector according to claim 1, wherein the flexible sheet from which the protector is formed is a plastics flute board with flute lines running vertically in the assembled protector.

5. A plant protector according to claim 1, wherein the sheet material is initially flat and is foldable around the plant to form a sleeve of a polygonal cross-section.

6. A plant protector according to claim 5, wherein the cross-section of an assembled protector is substantially of triangular shape.

7. A plant protector, comprising a flexible sheet adapted to be deformed to surround a growing plant to constitute a vertically elongate protective sleeve, said sheet having:

opposed elongate side edges which, when the sleeve is assembled around the plant, are in adjacent relationship;

a series of spaced projecting tabs along each of said edges so arranged that the tabs of the two side edges interengage to releasably secure the adjacent elongate side edges of the assembled sleeve with edge portions of adjacent tabs interengaging one behind the other;

means for securing an upper end of the plant protector to a horizontal supporting wire, said securing means comprising a securing flap extending from the upper end of the plant protector and foldable about a horizontal crease line around the supporting wire, and notches for receiving the supporting wire to locate the protector relative to the supporting wire; and means for releasably retaining the securing flap in its folded condition to releasably secure the plant protector to the supporting wire.

8. A plant protector according to claim 7, wherein the flexible sheet from which the protector is formed is a plastics flute board with flute lines running vertically in the assembled protector.

9. A plant protector according to claim 7, wherein the sheet material is initially flat and is foldable around the plant to form a sleeve of a polygonal cross-section.

10. A plant protector according to claim 9, wherein the cross-section of an assembled protector is substantially of triangular shape.

11. A plant protector, comprising:

a flexible sheet which is initially substantially flat and is adapted to be folded to surround a plant to constitute a vertically elongate protective sleeve;

means for sealingly and releasably securing adjacent side edges of the sheet in assembled relation comprising a series of spaced projecting tabs along each of said side edges, the projecting tabs having edge portions which releasably interengage one behind the other; and an integral securing flap at an upper end of the protector, said securing flap being foldable about a horizontal crease line alignable with a horizontal supporting wire whereby the securing flap may be folded over the supporting wire to an operative position at which releasable locking means on the securing flap retains the flap in position to secure the plant protector to the wire.

12. A plant protector according to claim 11, wherein the flexible sheet is folded to form lateral flaps bounding outlets for exit of lateral plant growth from adjacent the upper end of the protector.

13. A plant protector, comprising a flexible sheet adapted to be deformed to surround a growing plant to constitute a vertically elongate protective sleeve, said sheet having:

opposed elongate side edges which, when the sleeve is assembled around the plant, are in adjacent relationship, the flexible sheet folded along inclined fold lines to form lateral flaps bounding outlets for exit of lateral plant growth from adjacent an upper end of the protector; and means for releasably securing the adjacent elongate side edges of the assembled sleeve, said securing means comprising a series of spaced projecting tabs along each of said edges so arranged that the respective tabs of the two series interengage, with the edge portions of adjacent tabs interengaging one behind the other.

14. A plant protector, comprising:

a flexible sheet which is initially substantially flat and is adapted to be folded to surround a growing plant to constitute a vertically elongate protective sleeve, the flexible sheet folded to form lateral flaps bounding outlets for exit of lateral plant growth from adjacent the upper end of the protector;

means for sealingly and releasably securing adjacent side edges of the sheet in assembled relation, and an integral securing flap at an upper end of the protector, said securing flap being foldable about a horizontal crease line alignable with a horizontal supporting wire whereby the securing flap may be folded over the supporting wire to an operative position at which releasable locking means on the securing flap retains the flap in position to secure the plant protector to the wire.

15. A plant protector comprising a flexible sheet adapted to be deformed to surround a growing plant to constitute a vertically elongate protective sleeve, said sheet having:

opposed elongate side edges which, when the sleeve is assembled around the plant, are in adjacent relationship, and means for releasably securing adjacent elongate side edges of the assembled sleeve, said securing means comprising a series of spaced projecting tabs along each of said edges so arranged that respective projecting tabs of the two series interengage, with edge portions of adjacent projecting tabs interengaging one behind the other, and being of undercut formation whereby the interengaged edge portions of the flaps are positively interlocked one to the other to prevent any gaps through which the plant could grow.

16. A plant protector, comprising:

a flexible sheet which is initially substantially flat and is adapted to be folded to surround a growing plant to constitute a vertically elongate protective sleeve;

means for sealingly and releasably securing adjacent side edges of the sheet in assembled relation; and an integral securing flap with a releasable locking means at an upper end of the protector, the flap extending upwardly from a side wall, said flap being foldable about a horizontal crease line alignable with a horizontal supporting wire whereby the securing flap may be folded over the supporting wire downwardly to an operative position at which the supporting wire lies against the side wall and said releasable locking means engaging the sidewall to retain the flap in position to secure the plant protector to the wire.

* * * * *